United States Patent [19]

Covington et al.

[11] Patent Number: 4,853,926
[45] Date of Patent: Aug. 1, 1989

[54] SPLIT CARRIER FOR DATA STORAGE DISKS

[75] Inventors: Roger G. Covington, Rochester; Thomas D. Jensen, Himrod; Stephen H. Miller; Craig B. Wilson, both of Rochester, all of N.Y.

[73] Assignee: Eastman Kodak Company, Rochester, N.Y.

[21] Appl. No.: 208,190

[22] Filed: Jun. 16, 1988

[51] Int. Cl.⁴ .................. G11B 23/02; B65D 85/02
[52] U.S. Cl. .................................. 369/291; 206/312; 206/444; 360/133; 369/77.2
[58] Field of Search .............. 369/77.2, 291, 292; 206/309, 312, 316, 444; 360/133

[56] References Cited

U.S. PATENT DOCUMENTS

| | | | |
|---|---|---|---|
| 4,455,642 | 6/1984 | Inaba | 369/291 |
| 4,617,655 | 10/1986 | Alderhoven | 369/291 |
| 4,665,457 | 5/1987 | Odawara et al. | 360/133 |
| 4,707,821 | 11/1987 | Verhagen | 206/309 |
| 4,749,081 | 6/1988 | Carlson et al. | 369/77.2 |

*Primary Examiner*—Steven L. Stephan
*Attorney, Agent, or Firm*—Warren W. Kurz

[57] ABSTRACT

A carrier for releasably retaining a data storage disk comprises a pair of crescent shaped frame members which cooperate to define a generally circular aperture for receiving a data storage disk. The frame members are preferably identical in shape and slidably coupled so as to vary the size of the aperture. The aperture-defining walls of the frame members define arcuate grooves adapted to support the peripheral region of the data storage disk, preferably over an arc length of at least 90°. Spring means are provided for resiliently urging the frame members together so that the groove-defining surfaces of said frame members cooperate to support a data storage disk positioned in the aperture.

10 Claims, 6 Drawing Sheets

SPLIT CARRIER FOR DATA STORAGE DISKS

BACKGROUND OF THE INVENTION

This invention relates to the field of data storage and, more particularly, to improvements in apparatus for facilitating the handling and transport of data storage disks, e.g. optical and magnetic hard disks.

The desirability of handling high density data storage disks without contacting their delicate data recording surfaces is manifest. To facilitate the transport of a data storage disk without contacting the data recording surfaces thereof, it is known to dispose the disk in a so-called "disk carrier". Such a device typically comprises a rigid, planar frame, usually rectangular in shape, having a circular aperture therein slightly larger in diameter than the disk diameter. The disk is supported within the circular aperture by a plurality of spring-biased latches which engage the disk at the different points along the disk periphery. Prior to use in a disk player/recorder, the disk is released from the carrier by an unlatching mechanism associated with the disk player/recorder.

In the commonly assigned U.S. application Ser. No. 923,509 filed on Oct. 27, 1986 in the names of D.J. Stark et al, there is disclosed a disk carrier of the type mentioned above. The carrier frame is composed of several parts which are rigidly coupled to define a generally circular aperture of fixed diameter slightly larger than the data storage disk. The disk is supported within such aperture by a plurality of small tabs which support a disk from both sides over an arc length of about 10° or less, and a pair of movably mounted latches, each supporting the disk at two other locations equally spaced around the disk periphery. Each of the movable latches is spring-biased toward engagement with the disk periphery and ech serves to support the disk over an arc length of a few degrees. Prior to use, a disk-releasing mechanism associated with the disk player/recorder serves to urge the movable latches away from the disk periphery. By the arrangement disclosed, a disk may be released from the carrier without substantially displacing the disk relative to its intended axis of rotation.

Disk carriers of the above type are advantageous from the standpoint that a relatively small displacement of the movable latches from the disk periphery can readily effect release of the disk from the carrier. However, such carriers may be viewed as disadvantageous from the standpoint that, under certain conditions, they may release a disk prematurely. Such premature release may be occasioned by a sudden or jarring movement of the disk/carrier assembly, e.g. in the event the disk carrier is dropped. Also, since the disk carriers of the above type support the disk along relatively short arc lengths at three or four locations equally spaced about the disk periphery, the disk/carrier assembly tends to be somewhat flexible in nature. This lack of rigidity can give rise to transport and handling problems.

SUMMARY OF THE INVENTION

In view of the foregoing an object of this invention is to provide an improved carrier for a data storage disk, a carrier which is improved from the standpoint that, compared to the aforementioned disk carriers of the prior art, it is (1) less apt to prematurely release a disk in response to sudden acceleration and/or deceleration forces (2) more rigid, when supporting a data storage disk, and (3) simpler in construction and, hence, less costly to fabricate.

The carrier of the invention basically comprises a pair of crescent-shaped frame members which cooperate to define a generally circular aperture for receiving a data storage disk. Such members are slidably coupled to vary the size of the aperture, and spring means are provided for resiliently urging the frame members together, toward engagement with the perimeter of a disk located within the circular aperture defined by the frame members. Each of the frame members has a groove-defining arcuate surface which partially defines the aforementioned circular aperture, such groove serving to support the peripheral region of a disk from both sides over a major portion (e.g. 90°) of the disk periphery. Spring means are provided for resiliently urging the groove-defining surfaces into engagement with the disk periphery. Preferably, each frame member has structure which is engagable by a disk-releasing mechanism of a disk record/player to cause the frame members to move apart, thereby releasing a disk from the carrier for use. Preferably, both of the carrier frame members are of identical shape so that, except for the spring means, only one part need be manufactured to produce the carrier.

The invention and its advantages will be better understood from the ensuing detailed description of a preferred embodiment, reference being made to the accompanying drawings.

DETAILED DESCRIPTION OF PREFERRED EMBODIMENTS

Figure 1:
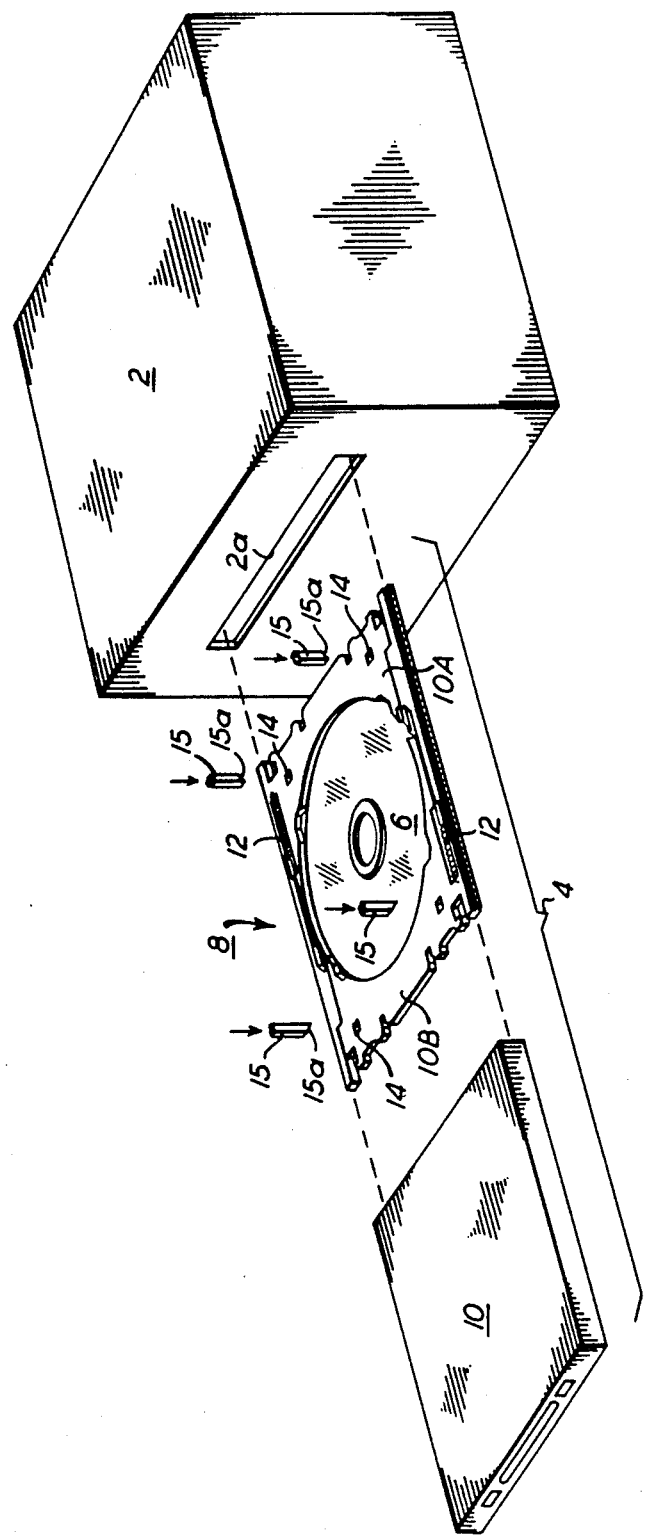
FIG. 1 is a perspective illustration of a data recording/playback system.

Referring now to the drawings, FIG. 1 illustrates a data recording/playback system comprising a disk drive unit 2 and a data storage disk assembly 4. The latter basically comprises a rigid data storage disk 6, a disk carrier 8 and a protective cartridge 10. As explained below, disk carrier 8 serves to releasably capture disk 6 so that the disk is accurately and securely registered within the carrier structure, yet is capable of being readily removed from the carrier for rotation in a plane spaced from the carrier. When not in use, the carrier and its captured disk are positioned within the protective cartridge, the latter being sufficiently rigid to guard against contact with the disk's recording surfaces. In use, the carrier-loaded cartridge is inserted into the disk drive unit through a slot 2a. Upon entering the disk drive unit, a mechanism within serves to extract the disk carrier from the cartridge and to return the cartridge to the user. The disk drive unit also includes apparatus for releasing the disk from its carrier and for loading the disk onto a drive spindle assembly for rotation. Such an apparatus is disclosed, for example, in the commonly assigned U.S. application Ser. No. 923,508, filed on Oct. 27, 1986 in the name of Dwight Petruchik, et al.

Figure 2A:
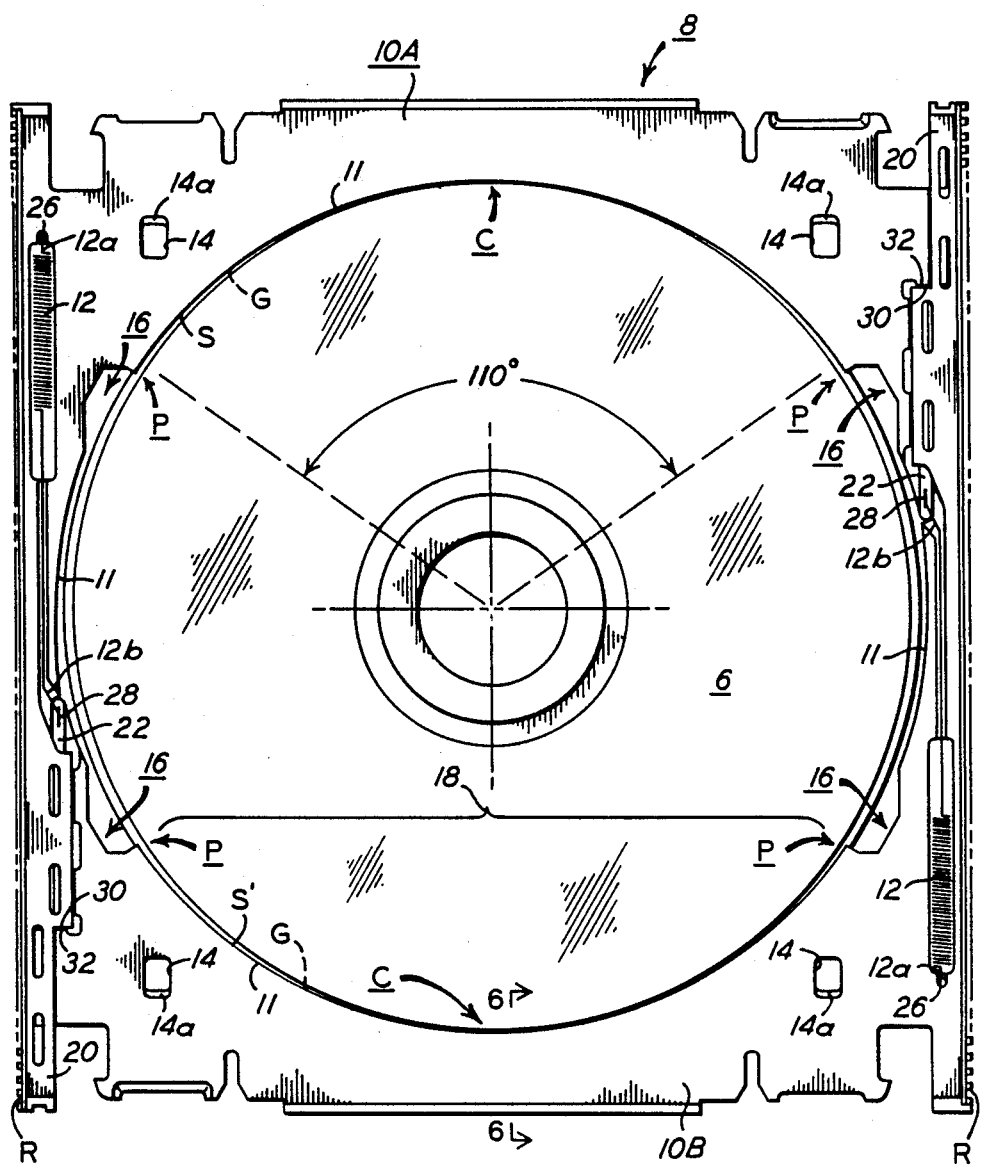
FIGS. 2A and 2B are top views of a preferred disk carrier showing the components in disk-retaining and disk-releasing positions, respectively.
Figure 2B:
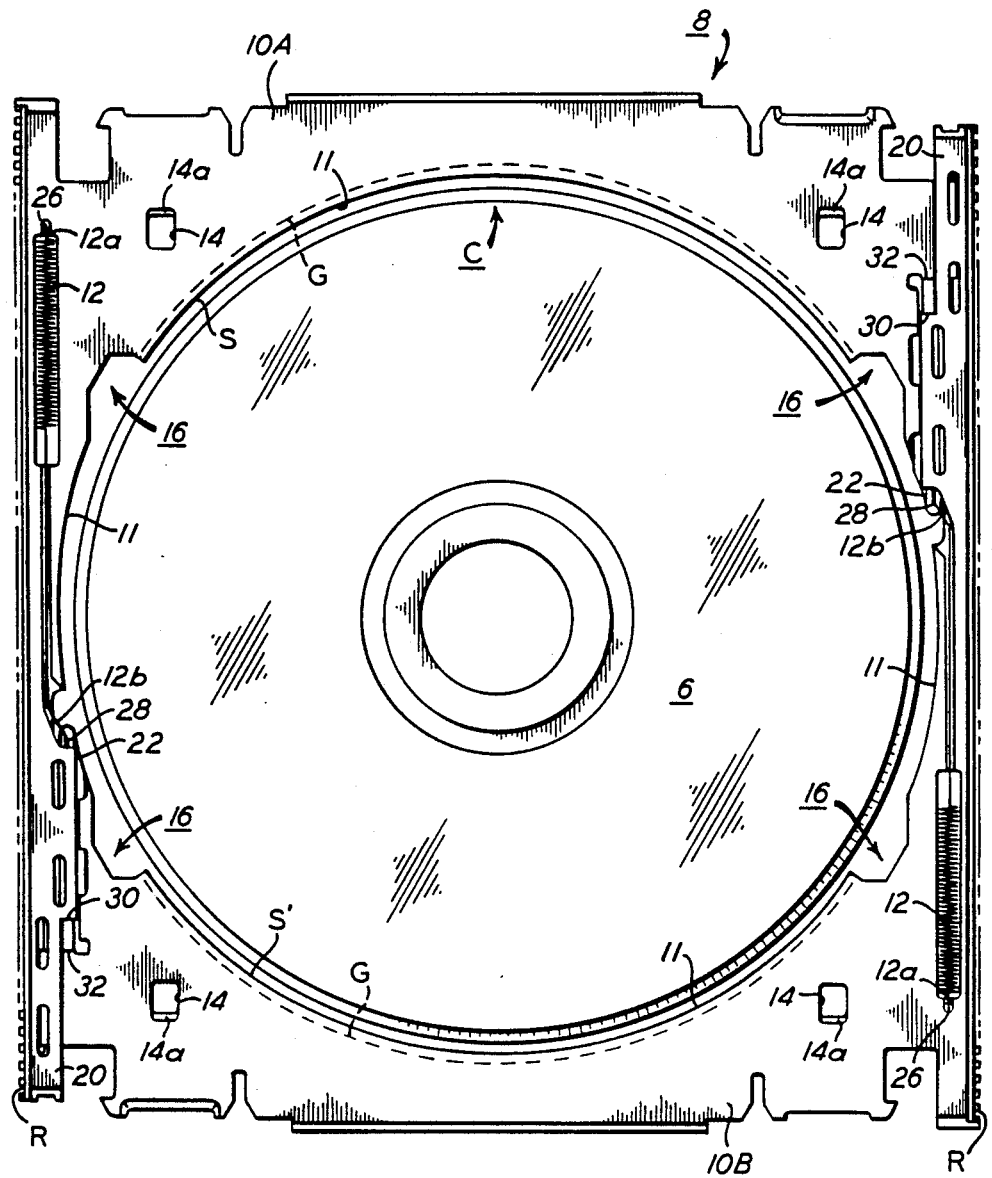

Referring to FIGS. 2A and 2B, disk carrier 8 basically comprises a pair of crescent-shaped frame members 10A, 10B having arcuate surfaces S, S', respectively, which cooperate to define a generally circular aperture 11 for receiving data storage disk 6. As explained in detail below, the crescent-shaped frame members are slidably connected by a tongue groove arrangement so that the size of the circular aperture can be varied, whereby a data storage disk can be captured within the aperture when the frame members are relatively close together, as shown in FIG. 2A, and released from the aperture when the frame members are relatively far apart, as shown in FIG. 2B. Spring means, preferably in the form of a pair of coil springs 12, serve to resiliently urge the frame members toward each other, i.e., toward disk-capturing positions. Preferably, each frame member is provided with structure which facilitates movement of the frame members apart to enable release of the disk for use. Such structure may comprise, for example, a plurality of rectangular apertures 14, each having a bevelled edge 14a which is adapted to be engaged by a like plurality of release pins 15, shown in FIG. 1. The interaction of such release pins and apertures to effect disk release is fully described in the aforementioned Petruchik et al patent. Briefly, however, downward movement of the release pins into apertures 14 causes cams surfaces 15a to engage the bevelled edges 14a of apertures 14. As the release pins move through these apertures, cam surfaces 15a exert lateral forces on the frame members, thereby tending to move such members apart against the biasing forces provided by springs 12.

Figure 6:
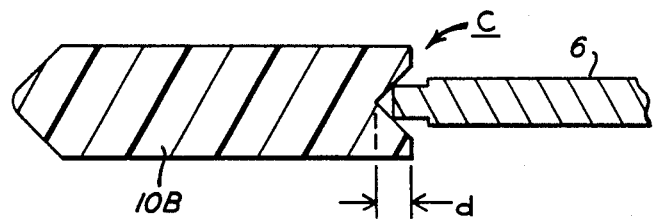
FIG. 6 is a cross-sectional view of the carrier frame shown in FIG. 2A, taken along the section line 6—6.

Capture of a disk within aperture 11 is effected a pair of grooves G formed in arcuate surfaces S, S'; the cross-section of one of the grooves being shown in FIG. 6. Each of the grooves is shaped and dimensioned to support a disk at its periphery over an arc length of at least 50°, and preferably over an arc length of about 110°, as shown. To reduce the amount by which the frame members must be displaced in order to release a disk, the groove depth d (shown in FIG. 6) is reduced from a maximum depth of about 4 millimeters at center C of the frame member, to a minimum depth of about 2 millimeters at the points P located at the end of the grooves. In the carrier shown in FIG. 2A, the length of the disk-supporting groove is determined by the position of cutouts 16 in the carrier aperture. These cutouts provide clearance for a disk-supporting mechanism associated with the disk drive which serves to support a disk at the time of its release from the carrier. By supporting the disk over a total arc length of at least 100°, the premature disk release problem mentioned above is minimized, and the carrier/disk assembly is considerably more supported than the carrier/disk assemblies of the prior art.

Figure 3A:
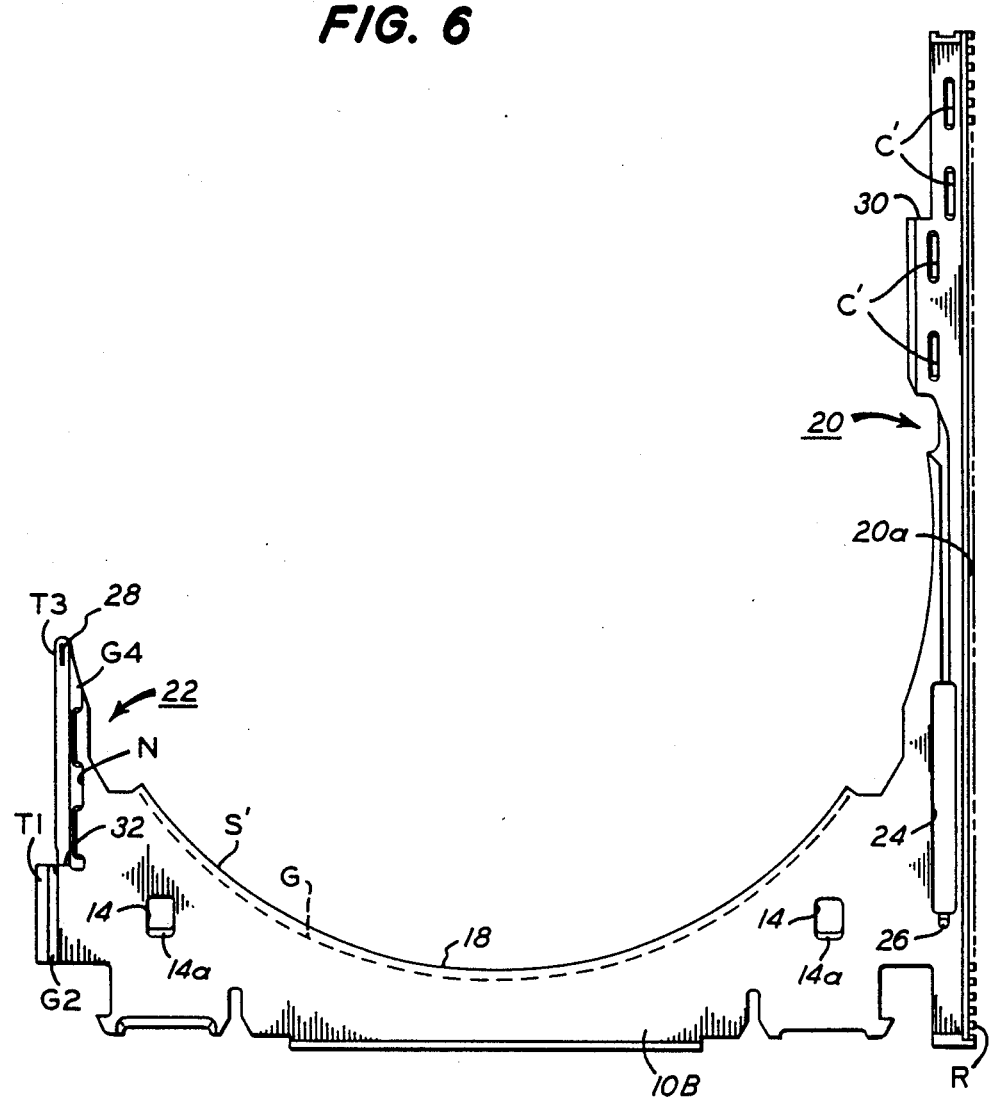
FIGS. 3A and 3B are top and bottom views, respectively, of one of the frame members comprising the carrier of the invention.
Figure 3B:
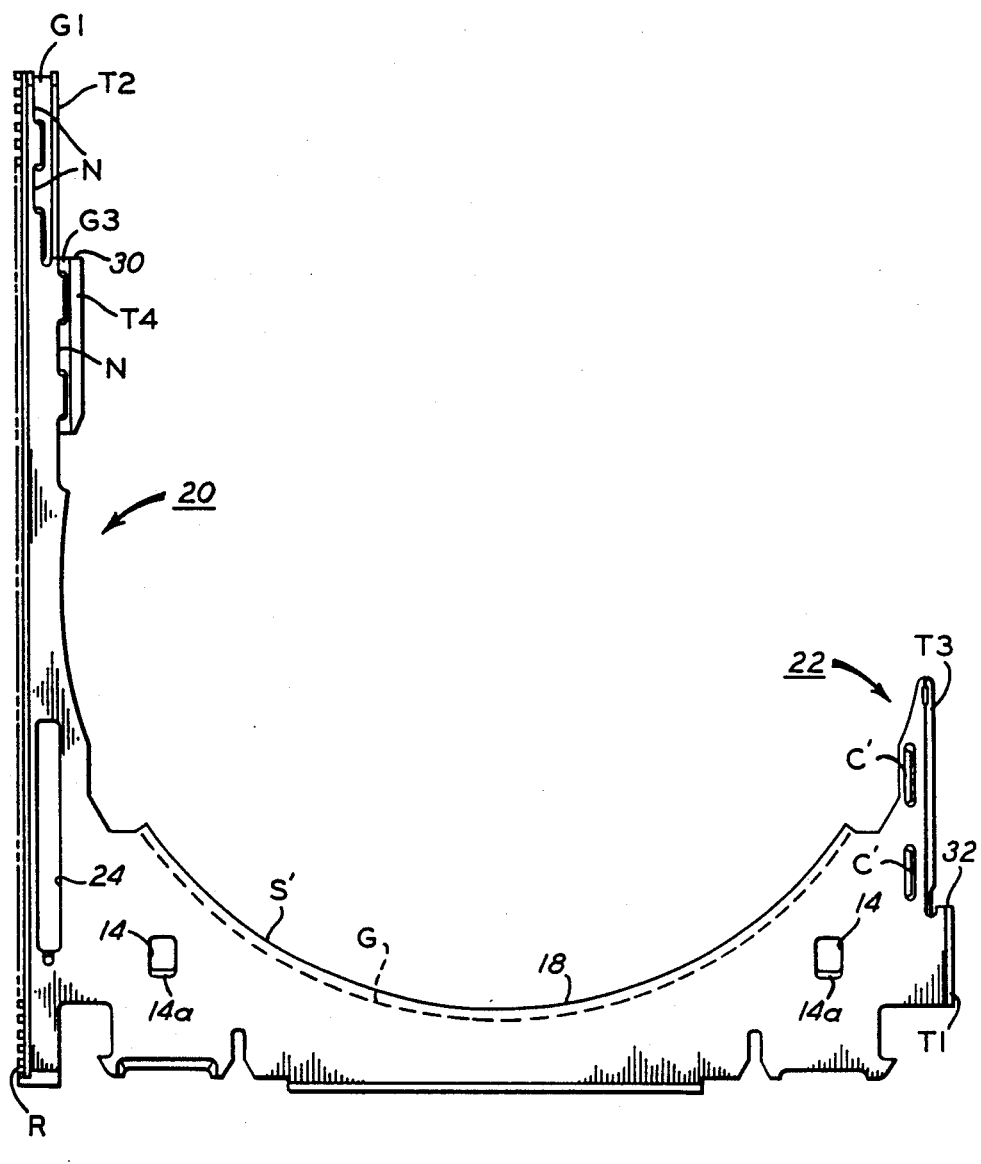

As indicated above, it is highly preferred, if only for reasons of economy, that each of the frame members 10A and 10B have the same identical structure. A preferred structure for these frame members is shown in FIGS. 3A and 3B. As shown, each of the frame members has a crescent-shaped portion 18 and a pair of coupling legs, 20, 22 disposed at opposite ends of such portion. As is apparent, coupling leg 20 is substantially longer than leg 22, and its outside edge 20A defines the entire lateral edge of the carrier. Preferably, edge 20A is provided with a rack of teeth R which extends along its entire length. Rack R is designed to cooperate with a toothed conveyor mechanism to advance the carrier in a disk utilization device. Such a conveyor mechanism is disclosed in the commonly assigned U.S. application Ser. No. 019,903 filed on Feb. 27, 1987 in the names of Deck et al, and entitled "Automated Disk Library". Each of the coupling legs is provided with a tongue and groove structure which enables two of the frame members shown in FIGS. 3A and 3B to be slidably coupled to produce the carrier assembly shown in FIGS. 2A and 2B. When so coupled, the tongue and groove structure on leg 20 will mate with the tongue and groove structure on leg 22. The tongue and groove structure of the coupling legs is best shown in FIGS. 4 and 5.

Figure 4:
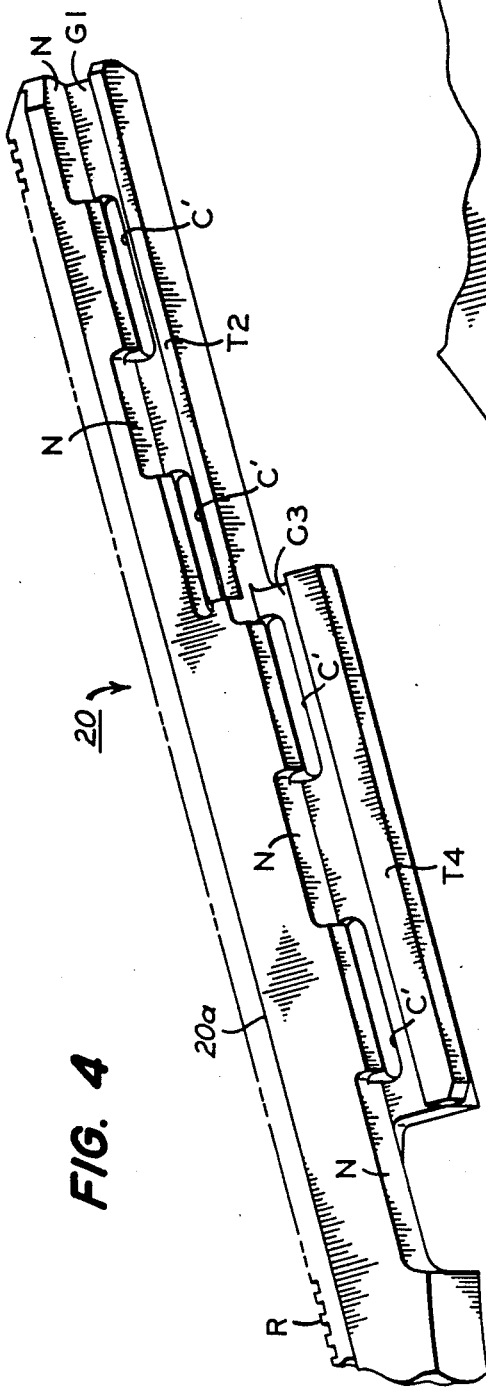
FIGS. 4 and 5 are enlarged perspective views of portions of each of the leg members comprising one of the carrier frame members.
Figure 5:
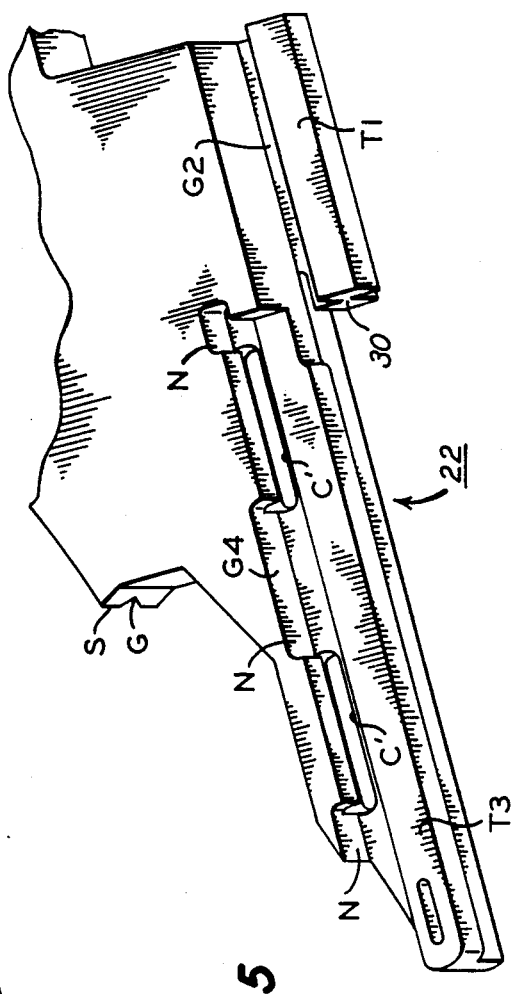

Referring now to FIGS. 4 and 5, leg 20 is shown to comprise the above-mentioned rack of teeth along its outside edge and means defining spaced, parallel grooves G1 and G3. Also, leg 20 is provided with spaced, parallel tongue members T2 and T4 which are located adjacent grooves G1 and G3, respectively. As shown in FIG. 3B, leg 20 is provided with an elongated recess 24 to receive the coiled portion of spring 12. When two of the frame members are slidably coupled, one end 12a of the coil spring is connected to a small aperture 26 formed adjacent recess 24, and the opposite end of the coil spring is connected to a small slot 28 formed near one end of leg 22. (See FIG. 2A). As best shown in FIG. 5, leg member 22 defines a pair of spaced, parallel grooves G2 and G4 which are adapted to receive the tongue members T2 and T4, respectively, of coupling leg 20. Leg 22 is also provided with a pair of spaced, parallel tongue members T1 and T3 which are adapted to be received by grooves G1 and G3, respectively formed ind leg member 22.

In addition to the aforementioned tongue and groove structure, coupling legs 20 and 22 are provided with reference surfaces 30 and 32, respectively. As shown in FIG. 2A, these reference surfaces only abut each other when no disk is present (or when the disk tolerances are minimum). Normally, when a disk is present, the disk will determine the relative positions of the frame members, and reference surfaces 30, 32 will be slightly spaced apart.

Preferably, frame members 10A and 10B are made of a plastic material, such as polycarbonate, and the structure shown is produced by a conventional injectio molding process. To facilitate the production of grooves G1–G4 by this injection molding process, a series of notches N and cutouts C are formed in the leg members. These notches and cutouts have no function other than that of facilitating the injection molding process.

From the foregoing, it will be appreciated that the disk/carrier of the invention has a "split" composition, being composed of two identical components which may be split apart to receive or release a disk. Being made of two identical and injection-moldable components which simply slide together, it will be appreciated that the manufacturing and assembly costs are relatively small. After being slidably connected, the only other assembly step is to attach the coil springs. Also, it should be appreciated that, owing to the arrangement of the tongue and groove joints, a relatively rigid structure is produced. Not only does each leg have two individual tongue and groove joints, these joints are both laterally and longitudinally displaced relative to each other. Also, by locating these joints in the corners of the frame, rather than midway along the lateral edge of the carrier frame, there need be no discontinuity in the rack of teeth R, and the overall width of the carrier need not be substantially greater than the diameter of the disk.

While the invention has been disclosed with reference to a particularly preferred embodiment, it should be apparent that the "split" character of the disk carrier may take a variety of forms. For example, where the continuity of the lateral edges of the carrier is not important, e.g., in carriers of the type in which there is no rack of teeth along such edge, the carrier should be split in the middle and a different slidable coupling could be provided. Other variations will be apparent to those skilled in the art, and such variations are intended to be within the scope of the appended claims.

What is claimed is:

1. A carrier for releasably retaining a data storage disk, said carrier comprising:
   (a) a pair of identically shaped crescent-shaped frame members which cooperate to define a generally circular aperture for receiving a data storage disk, said frame members being slidably coupled to vary the size of said circular aperture, said circular aperture being defined, at least in part, by arcuate surfaces on each of said frame members, said arcuate surfaces defining an arcuate groove which is adapted to engage and support the peripheral region of a data storage disk, each of said frame members comprising a pair of parallel leg members, both of said leg members having integral tongue and groove structure which is adapted to mate with the tongue and groove structure of the leg members of the other said frame members to slidably couple said frame members together; and
   (b) means for urging said frame members together so that the arcuate groove-defining surfaces of said frame members cooperate to engage the peripheral region of the data storage disk positioned in said aperture.

2. The apparatus as defined by claim 1 wherein the arcuate groove of each frame member is adapted to support the peripheral region of a data storage disk over at least an arc length of 50°.

3. The apparatus as defined by claim 1 wherein both leg members of each frame member define two spaced and parallel grooves and two spaced and parallel tongue members, said grooves and tongue members of one frame member being adapted to cooperate with said grooves and tongue members of the other frame member to slidably couple said frame members.

4. The apparatus as defined by claim 1 wherein said urging means comprises a pair of coil springs.

5. The apparatus as defined by claim 3 wherein said grooves and tongue members defined by said leg members are longitudinally spaced.

6. The apparatus as defined by claim 1 wherein said frame members are provided with cooperating reference surfaces which limit the sliding movement of said frame members toward each other by said urging means.

7. The apparatus as defined by claim 1 wherein each of said frame members is provided with structure adapted to cooperate with a disk-releasing mechanism of a disk utilization device to cause the frame members to move apart to release a disk from the carrier.

8. The apparatus as defined by claim 1 wherein said carrier has a generally rectangular shape and wherein one of said pair of leg members is longer than the other of said pair, the longer leg member of one of said pairs being adapted to slidably couple with the shorter leg member of the other of said pairs, whereby the regions at which the frame members are coupled together are diagonally disposed with respect to said rectangular shape.

9. The apparatus as defined by claim 8 wherein said longer leg member defines an entire lateral edge of said rectangular shape.

10. The apparatus as defined by claim 9 wherein said longer leg member of each frame member is provided with a rack of teeth along said entire lateral edge.

* * * * *